(12) United States Patent
Price et al.

(10) Patent No.: US 9,038,909 B2
(45) Date of Patent: May 26, 2015

(54) PRINTER SIDE VERIFICATION MECHANISM

(75) Inventors: Stephen Goddard Price, Longmont, CO (US); James A. Krack, Longmont, CO (US); Samuel Neely Hopper, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 986 days.

(21) Appl. No.: 12/604,826

(22) Filed: Oct. 23, 2009

(65) Prior Publication Data

US 2011/0095078 A1    Apr. 28, 2011

(51) Int. Cl.
| | | |
|---|---|---|
| G06K 19/00 | (2006.01) | |
| G06K 15/16 | (2006.01) | |
| B41J 3/01 | (2006.01) | |
| B41J 3/60 | (2006.01) | |
| G06K 15/02 | (2006.01) | |
| G06K 17/00 | (2006.01) | |

(52) U.S. Cl.
CPC . *G06K 15/16* (2013.01); *B41J 3/01* (2013.01); *B41J 3/60* (2013.01); *G06K 15/021* (2013.01); *G06K 17/0016* (2013.01); *G06K 2215/0094* (2013.01)

(58) Field of Classification Search
USPC .......................... 235/375, 462.04; 347/18, 178
See application file for complete search history.

(56) References Cited

U.S. PATENT DOCUMENTS

| | | | |
|---|---|---|---|
| 5,531,530 A * | 7/1996 | Kuramoto et al. | 400/593 |
| 5,548,663 A | 8/1996 | Sekine et al. | |
| 5,967,032 A * | 10/1999 | Bravenec et al. | 101/211 |
| 7,133,156 B2 | 11/2006 | Motomura | |
| 7,260,258 B2 | 8/2007 | Foote et al. | |
| 7,460,706 B2 | 12/2008 | Doumoto et al. | |
| 2005/0219304 A1* | 10/2005 | Ueda | 347/19 |
| 2006/0022050 A1* | 2/2006 | Critelli et al. | 235/462.08 |
| 2006/0081711 A1 | 4/2006 | Zhao et al. | |
| 2006/0144947 A1* | 7/2006 | Sali et al. | 235/462.04 |
| 2008/0156863 A1* | 7/2008 | Abrott | 235/375 |
| 2009/0040563 A1 | 2/2009 | Mestha et al. | |
| 2009/0161149 A1* | 6/2009 | Noguchi et al. | 358/1.15 |

FOREIGN PATENT DOCUMENTS

JP        2008102201        5/2008

OTHER PUBLICATIONS

English Machine Translation of JP-2008-102201 A.*
Pei, Songwen, et al., "Codec System Design for Continuous Color Barcode Symbols", IEEE 9780769532424, (Apr. 2008), 539-544.

* cited by examiner

*Primary Examiner* — Matthew Mikels
(74) *Attorney, Agent, or Firm* — Blakely, Sokoloff, Taylor & Zafman LLP

(57) ABSTRACT

A method includes generating a machine readable code using each ink color implemented at a printer, printing the machine readable code on a first side of the medium, analyzing the machine readable code printed on the first side of the medium at a verification unit and detecting a side mismatch if the verification unit does not verify the machine readable code printed on the first side of the medium.

28 Claims, 3 Drawing Sheets

PRINTER SIDE VERIFICATION MECHANISM

FIELD OF THE INVENTION

The invention relates to the field of printing, and in particular, to verification of data on two-sided printed documents.

BACKGROUND

For many years, computer printers had the capability of printing on only one side of paper. Recently, however, printing on both sides of paper has become the norm. With continuous forms (e.g., roll-fed) printers, two-sided printing is typically accomplished by using a pair of print engines, with a mechanism in between them that turns the paper over as it travels between print engines. However, there are a number of technical challenges for a printing system in carrying out such a procedure reliably and accurately.

Moreover, it would result in an extremely serious error if the front and back sides of a sheet were ever printed with the mismatched sides. Such an error is referred to as a side mismatch. A side mismatch may result in, for example, a hospital bill being printed with the front side having the name and address of patient A, and the back side having the itemized invoice details for patient B.

As a mechanism for detecting side mismatches, two-engine duplex printers often associate a unique identifier with the data for a pair of matching sides, and then print a machine-readable version of the identifier on the first side of the sheet and then read that mark in the second printer, and compare the value read with the value just printed or about to be printed by the second printer. If the value read is not as expected, that means a side mismatch error has occurred (or is about to occur). This system of printing, reading, and checking unique identifiers to prevent side mismatch errors is known as a Side 2 Verification system.

Another mechanism used to detect side mismatches implements industry standard barcodes that are printed on both the front and the back of each sheet, where the same barcode value is written on both sides of a sheet and each subsequent sheet gets a new barcode value. Two barcode readers are positioned to read the barcodes on each side of a sheet. Subsequently, the read values are compared. If the values are not identical for a given sheet, then there is a side mismatch error.

A problem exists with using such a mechanism on a color printer since the color printed on a page may come from a combination of several planes of color (e.g., cyan, magenta, yellow, and black), and the data for each of these colors is processed through a series of parallel but separate components. Thus, the potential exists for a side mismatch error to happen on only one color plane. Because barcodes are conventionally printed only in black, the potential exists for a side mismatch error to escape undetected when the error does not affect the black color plane.

Accordingly, a mechanism to detect a side mismatch error that occurs in one or more color planes is desired.

SUMMARY

In one embodiment, a method is disclosed including generating a machine readable code using each ink color implemented at a printer, printing the machine readable code on first side of the medium, analyzing the machine readable code printed on the first side of the medium at a verification unit and detecting a side mismatch if the verification unit does not verify the machine readable code printed on the first side of the medium.

Another embodiment discloses a printer. The printer includes a first print head to print a machine readable code on a first side of a medium and a side verification unit. The side verification unit generates the machine readable code using each ink color implemented at the printer, analyzes the machine readable code printed on the first side of the medium and detects a side mismatch if the machine readable code printed on the first side of the medium is not verified.

BRIEF DESCRIPTION OF THE DRAWINGS

A better understanding of the present invention can be obtained from the following detailed description in conjunction with the following drawings, in which.

DETAILED DESCRIPTION

A mechanism for verification of multi color marks on print sides is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
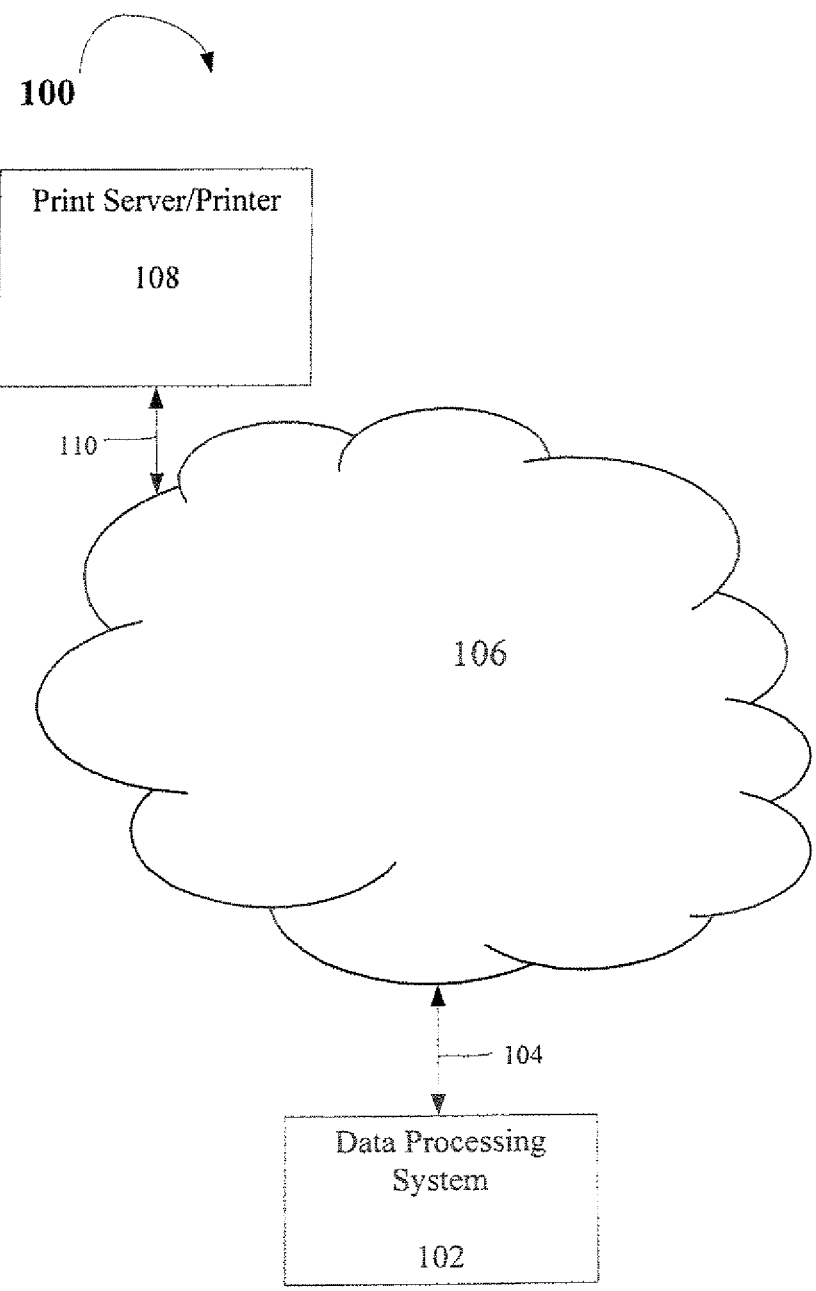
FIG. 1 illustrates one embodiment of a data processing system network.

FIG. 1 illustrates one embodiment of a data processing system network 100. Network 100 includes a data processing system 102, which may be either a desktop, host computer or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server/printer 108 serving print requests over network 106 received via communications link 110 between print server/printer 108 and network 106. The operating system on data processing system 102 is capable of selecting print server/printer 108 and submitting requests for services to print server/printer 108 over network 106. Print server/printer 108 includes a print queue for print jobs requested by remote data processing systems 102. Further, print server/printer 108 includes a control unit to perform operations associated with printing a request.

Although described as incorporated within the same entity, other embodiments may include the print server and the printer as being physically separate components. Therefore, the data processing system network 100 depicted in FIG. 1 is selected for the purposes of explaining and illustrating the present invention and is not intended to imply architectural limitations. Those skilled in the art will recognize that various additional components may be utilized in conjunction with the present invention.

Figure 2:
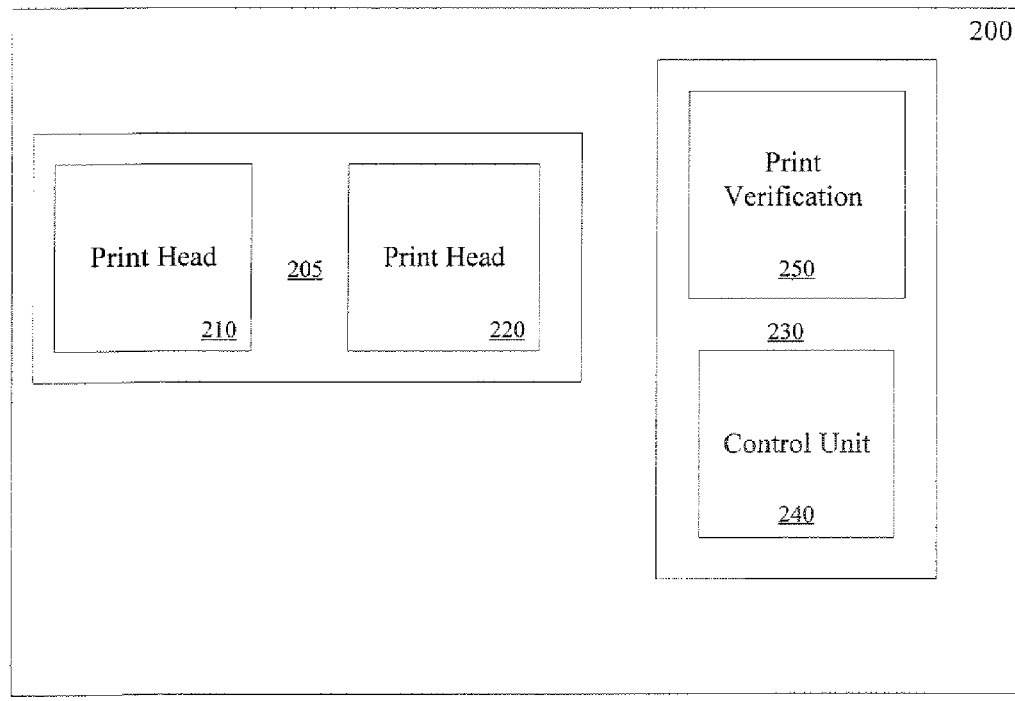
FIG. 2 illustrates one embodiment of a printer.

FIG. 2 illustrates one embodiment of a printer 200. In one embodiment, ink jet printer 200 is implemented as the printing component of print server/printer 108. Printer 200 includes print engine 205, and side verification unit 230. Print engine 205 includes print heads 210 and 220, which include printing elements that print to a print medium.

In one embodiment, print head 210 prints to one side of a page, while print head 220 prints to the other. In such an embodiment, the pages are provided to the print heads as continuous forms. In a further embodiment, printer 200 includes a mechanism (not shown) between print heads 210 and 220 that turns the paper over as it travels from print head 210 to print head 220.

Side verification unit 230 includes control unit 240 and print verification unit 250. Control unit 240 controls the operation of side verification unit 230. Thus, control unit 240 facilitates the generation of a unique machine readable identifier that is printed on both the front and the back of each printed sheet at print engines 210 and 220, where each subsequent sheet gets a new barcode machine readable identifier value.

Figure 3:
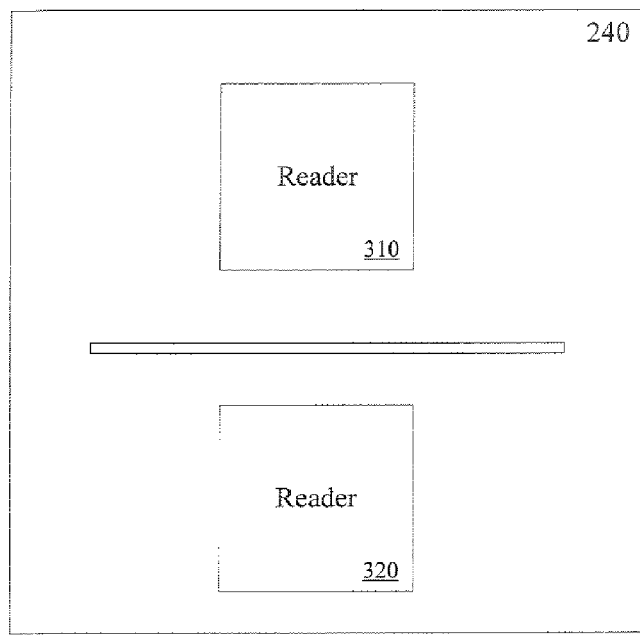
FIG. 3 illustrates one embodiment of a print verification unit.

Subsequently, the machine readable identifiers are read at print verification unit 250. FIG. 3 illustrates one embodiment of a print verification unit 250. Print verification unit 250 includes readers 310 and 320 that are positioned to read the machine readable identifier from each paper side after the paper leaves the print engine 220. The values read by readers 310 and 320 are then compared at control unit 240. If the values are not identical for a given sheet, then there is a side mismatch error and control unit 240 may generate an alarm.

In one embodiment, the machine readable identifiers are barcodes, with barcode scanners being used as readers 310 and 320. In such an embodiment, linear or two-dimensional barcodes may be implemented. However in other embodiments, other types of machine readable code, such as modulated-size marks, may be used.

As discussed above, side mismatch errors may go undetected in color printers that print black barcodes because of the potential for a side mismatch error occurring in only one color plane. Thus in one embodiment, side verification unit 230 performs side verification using multi-color marks in the generated barcodes and color scanners implemented as readers 310 and 320 to read the color codes.

In such an embodiment, barcode elements are generated having pure color marks using each ink color such that each complete barcode uses all ink colors implemented at printer 200. Therefore, side verification unit 230 will verify whether each color of a barcode is readable prior to comparing the barcodes on each side for a match. As a result, verification unit 230 will not verify a barcode as correct unless all colors are working.

Figure 4:
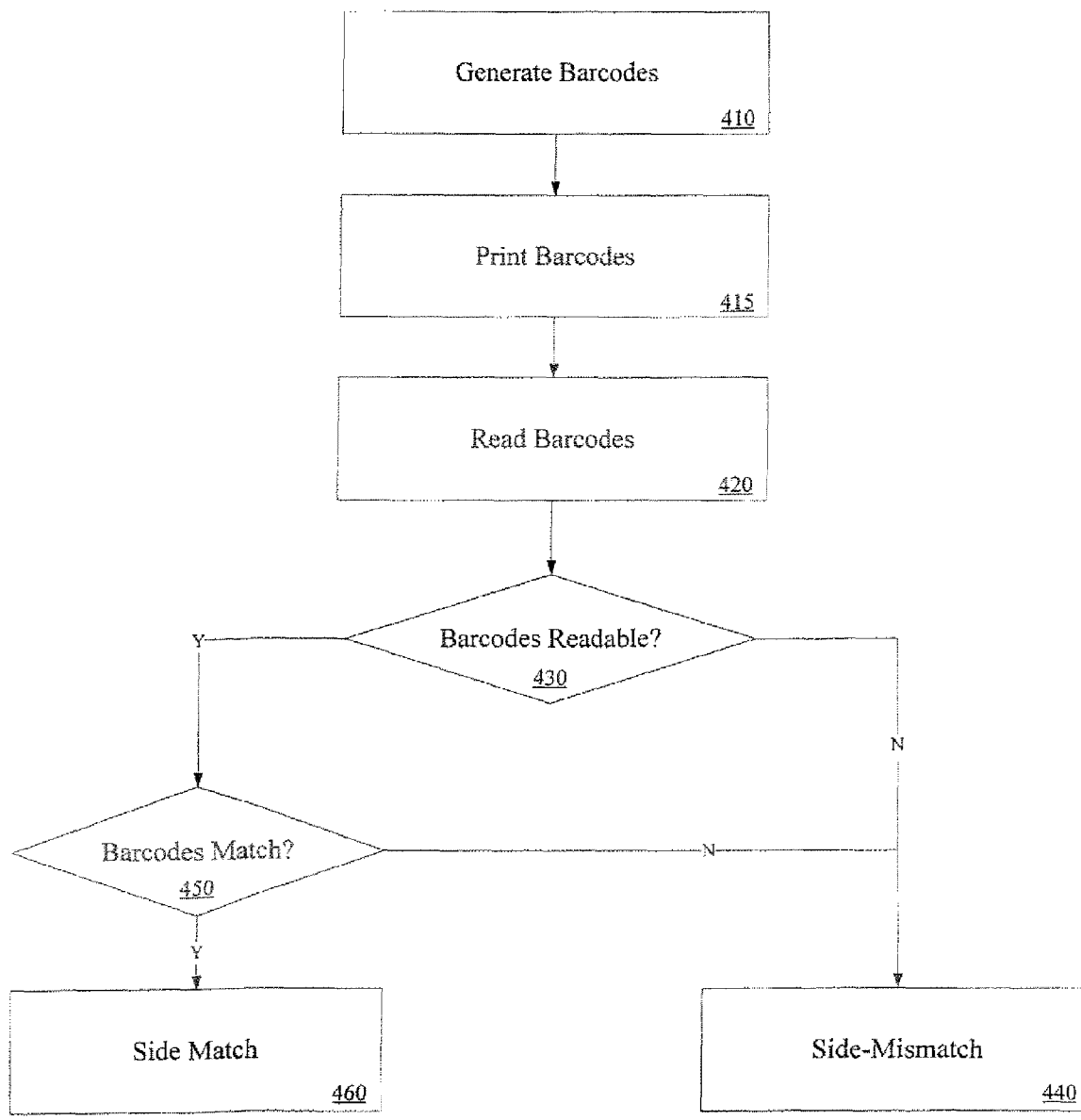
FIG. 4 is a flow diagram illustrating one embodiment of the operation of a side verification mechanism.

FIG. 4 is a flow diagram illustrating one embodiment of the operation of side verification unit 230. At processing block 410, control unit 240 facilitates the generation of the above-described color barcode identifiers at print heads 210 and 220 on each side of a sheet of paper. At processing block 415, the barcodes are printed. At processing block 420, the sheet of paper is passed through verification unit 250 where the color barcodes are read at readers 310 and 320.

At decision block 430, control unit 240 determines if each color barcode was properly read. According to one embodiment, if the data for any one color is printed incorrectly on either side of the paper (e.g., shifted on the page, or the wrong data printed), reader 310 or 320 will not read that color, resulting in the barcode being unreadable regardless of which color has the problem.

If one or both barcodes were not properly read at reader 310 or 320, a side mismatch has been detected and a notification is generated to alert a printer 200 operator of the error, processing block 440. If, however, both color barcodes are read properly, control unit 240 compares the barcodes to determine whether they match, decision block 450. If the read values are not identical, a side mismatch error has been detected, and control is returned to processing block 440. If the read values are identical, the two sides match and the page is forwarded for further processing, processing block 460.

One embodiment of the present invention uses different colors for each character (number or letter) in the barcode since most barcode symbologies represent a string of numerals and/or letters. For such an embodiment where the barcode includes six numeric digits and the printer is a four color printer, the first character may be printed in cyan, the second in magenta, the third in yellow, the fourth in black, the fifth in cyan, and the sixth in magenta.

In another embodiment, the color on every mark (e.g., bar) in the bar code is varied. In such an embodiment, the bar code symbology may use marks of four different widths, with the full barcode being made up of eight bars. For instance, the barcode may be: w2 w3 w3 w2 w4 w1 w4 w2, where w1, w2, w3, and w4 indicate a bar of a given width. In this embodiment, the bars could be printed with all four colors as: w2 cyan, w3 magenta, w3 yellow, w2 black, w4 cyan, w1 magenta, w4 yellow, w2 black.

In yet another embodiment, each bar in the barcode could be made up of smaller segments of each of the colors. In this embodiment, the colors may rotate from bar to bar (e.g., the first bar could be cyan-magenta-yellow-black, and the second could be black-yellow-magenta-cyan, etc).

In still a further embodiment, readers 310 and 320 have the ability to adapt to varying density of print and varying whiteness. In such an embodiment, the readers examine the data it reads each time, finds the highest and lowest densities in that area to establish a threshold between a mark and blank area and interprets the read data based on the range to decode what area is marked and what area is blank. Thus, all colors are present in each barcode, and may appear to be different densities to the bar code reader. For example, yellow probably appears much less dark than black. Therefore, the barcode reader might interpret all of the yellow areas as blank instead of as marked.

To perform side verification in such an embodiment, a density is specified for each color based on the technology of printer 200 and the technology of the reader 310 and 320, so that all colors are read equally by the barcode reader. For example, cyan may be printed at 70%, magenta at 80%, yellow at 100%, and black at 55%.

In embodiments where side verification unit 230 performs side verification using modulated-size marks, each mark is made up of contiguous strips of pure color. For example, if the mark is to be 6 mm long, a 1.5 mm stripe of cyan is printed adjacent to a 1.5 mm strip of magenta, adjacent to a 1.5 mm stripe of yellow, adjacent to a 1.5 mm strip of black.

In some instances it may not be practical to use all colors of ink. One such instance would be when printing on colored media. For example, if the media is yellow, a barcode printed in yellow would not be visible to a barcode reader. Another issue would be that after the pages are printed by the printer, they may be handled by one or more post processing machines, such as inserters. These machines may also read the barcodes for their own purposes. The barcode readers for these machines may have different color sensitivities than the ones in the printer. For example, a bar code reader may use a red laser to illuminate the barcode, and be insensitive to magenta printing. In this case, using magenta in the barcode would be a problem. Therefore, printer 200 is provided with a setting that enables an operator to specify a subset of available ink colors to be used for the barcodes, and side verification would be performed for only the subset of colors chosen by the operator, not for the omitted colors.

Although described above with respect to a single printer 200 embodiment, the print verification mechanism may be implemented in other printer embodiments. For instance, printer 200 may be a color simplex printer. In such an embodiment, verification unit 240 would include only one barcode reader. Thus, verification unit 240 would not need to match front and back sides, but only verify that all colors are printing correctly.

In another embodiment, printer 200 may be a "4/1" or "N/1" printer, where one side is printed in color and the other side in monochrome. In this embodiment, verification unit 240 would be matching front to back, and also verifying all colors on the color side and the single color on the other side. This embodiment may also extend to "N/M" where there is color on both sides, but not the same number colors. For example, one side is CMYK and the other side is black plus a spot color, or black plus MICR (magnetic ink).

In yet another embodiment, printer 200 may be a duplex printer where the barcode is printed only on the first side and read when the second side is printed, and compared to what is expected for that sheet. In this embodiment verification unit 240 verifies all colors on the first side. This would be reasonable implementation for a 4/1, or a full color duplex printer where one side is printing critical information and the other side is printing unimportant information (such as standard fine print/boilerplate text).

In still another embodiment, printer 200 is implemented as a "4/4" or "4/1" or "N/M" printer, with an additional print unit that prints one or more other types of ink. For example, the additional ink could be MICR or spot color(s). In such an embodiment, if the additional print unit prints only on one side of the paper, and has X colors, and the main print unit prints on that side of the paper with Y colors, the barcode logically includes all X+Y colors, and the first printer prints part of the barcode using its Y colors, and leaving space for the additional unit to complete the barcode with its X colors, and then the additional print unit completes the bar code with its X colors. The barcode readers are located in the additional print unit. Likewise, if the additional unit prints on both sides of the paper, then the barcodes for each side are managed as described above for the one side.

However, instead of checking the barcodes after all print units have printed their respective components of the barcode, the main print unit, in a further embodiment, would check the partial barcodes, and the additional print unit would subsequently check the complete barcodes. This has the advantage of detecting an error that occurs in the main print unit sooner. In such an embodiment, two sets of barcode readers are implemented. The first is in the main unit, where it reads and checks a partial (and therefore invalid) barcode. The second is in the additional print unit where it checks the complete barcodes.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
   generating a machine readable code having multi-color marks including each ink color implemented at a printer;
   printing the machine readable code on a first side of a medium;
   analyzing the machine readable code printed on the first side of the medium at a verification unit; and
   detecting an error if the verification unit does not verify that each color of the multi-color marks is readable.

2. The method of claim 1 further comprising:
   printing the machine readable code on a second side of the medium;
   analyzing the machine readable code printed on the second side of the medium at the verification unit; and
   detecting an error if the verification unit does not verify that each color of the machine readable code is readable on the second side of the medium.

3. The method of claim 2 wherein analyzing the machine readable code at the verification unit comprises:
   reading the machine readable code printed on the first side of the medium at a first reader; and
   reading the machine readable code printed on the second side of the medium at a second reader.

4. The method of claim 3 further comprising:
comparing the machine readable code printed on the first side of the medium with the machine readable code printed on the second side of the medium; and
detecting a side mismatch if the machine readable code printed on the first side of the medium does not match the machine readable code printed on the second side of the medium.

5. The method of claim 1 wherein the machine readable code comprises a barcode.

6. The method of claim 5 wherein printing the barcode comprises varying colors for each character in a string of characters comprising the barcode.

7. The method of claim 5 wherein printing the barcode comprises varying colors for each bar comprising the barcode.

8. The method of claim 5 wherein printing the barcode comprises varying color segments in each bar of the barcode.

9. The method of claim 5 wherein a density is specified for each color printed in the barcode.

10. The method of claim 1 wherein the machine readable code comprises modulated-size marks.

11. The method of claim 10 wherein each mark comprises contiguous strips of color.

12. A printer comprising:
a first print head to print a machine readable code on a first side of a medium; and
a side verification unit to generate the machine readable code having multi-color marks including each ink color implemented at a printer, analyze the machine readable code printed on the first side of the medium and detect an error if the verification unit does not verify that each color of the multi-color marks is readable.

13. The printer of claim 12 wherein the printer further comprises a second print head to print the machine readable code on a second side of the medium.

14. The printer of claim 13 wherein the side verification unit comprises:
a verification unit, including:
a first reader to read the machine readable code printed on the first side of the medium; and
a second reader to read the machine readable code printed on the second side of the medium; and
a control unit to determine that the machine readable code is detected at the first and second readers.

15. The printer of claim 14 wherein the control unit further compares the machine readable code printed on the first side of the medium with the machine readable code printed on the second side of the medium and detects a side mismatch if the machine readable code printed on the first side of the medium does not match the machine readable code printed on the second side of the medium.

16. The printer of claim 13 wherein the machine readable code is a barcode.

17. The printer of claim 16 wherein the barcode comprises varying colors for each character in a string of characters comprising the barcode.

18. The printer of claim 16 wherein the barcode comprises varying colors for each bar comprising the barcode.

19. The printer of claim 16 wherein the barcode comprises varying color segments in each bar of the barcode.

20. The printer of claim 16 wherein a density is specified for each color printed in the barcode.

21. The printer of claim 13 wherein the machine readable code is modulated-size marks.

22. The printer of claim 21 wherein each mark comprises contiguous strips of color.

23. An article of manufacture comprising a machine-readable medium including data that, when accessed by a machine, cause the machine to perform operations comprising:
generating a machine readable code having multi-color marks of including each ink color implemented at a printer;
printing the machine readable code on a first side of a medium;
analyzing the machine readable code printed on the first side of the medium at a verification unit; and
detecting an error if the verification unit does not verify that each color of the multi-color marks is readable.

24. The article of manufacture of claim 23 including data that, when accessed by the machine, cause the machine to perform further operations comprising:
printing the machine readable code on a second side of the medium;
analyzing the machine readable code printed on the second side of the medium at the verification unit; and
detecting a side mismatch if the verification unit does not verify that each color of the machine readable code is readable on the second side of the medium.

25. The article of manufacture of claim 24 wherein analyzing the machine readable code at the verification unit comprises:
reading the machine readable code printed on the first side of the medium at a first reader; and
reading the machine readable code printed on the second side of the medium at a second reader.

26. The article of manufacture of claim 25 wherein the machine-accessible medium includes data that causes the machine to perform further operations comprising:
comparing the machine readable code printed on the first side of the medium with the machine readable code printed on the second side of the medium; and
detecting a side mismatch if the machine readable code printed on the first side of the medium does not match the machine readable code printed on the second side of the medium.

27. The article of manufacture of claim 24 wherein the machine readable code comprises a barcode.

28. The article of manufacture of claim 24 wherein the machine readable code comprises modulated-size marks.

* * * * *

UNITED STATES PATENT AND TRADEMARK OFFICE
CERTIFICATE OF CORRECTION

Page 1 of 1

PATENT NO. : 9,038,909 B2
APPLICATION NO. : 12/604826
DATED : May 26, 2015
INVENTOR(S) : Stephen Goddard Price et al.

It is certified that error appears in the above-identified patent and that said Letters Patent is hereby corrected as shown below:

In the Claims

In column 8, at line 16 Claim 23, delete, "marks of" and insert --mark--.

Signed and Sealed this
Twenty-ninth Day of September, 2015

Michelle K. Lee
*Director of the United States Patent and Trademark Office*